(12) United States Patent
Mihovics et al.

(10) Patent No.: US 12,362,964 B2
(45) Date of Patent: Jul. 15, 2025

(54) SYSTEMS AND METHODS FOR COLLECTING TELEMATICS DATA FROM TELEMATICS DEVICES

(71) Applicant: Geotab Inc., Oakville (CA)

(72) Inventors: Garrett Ryan Mihovics, Thamesford (CA); Matthew Frederick Snow, Kitchener (CA); Robert Swanson, Waterloo (CA)

(73) Assignee: Geotab Inc., Oakville (CA)

( * ) Notice: Subject to any disclaimer, the term of this patent is extended or adjusted under 35 U.S.C. 154(b) by 371 days.

(21) Appl. No.: 18/120,760

(22) Filed: Mar. 13, 2023

(65) Prior Publication Data
US 2023/0379189 A1 Nov. 23, 2023

Related U.S. Application Data

(60) Provisional application No. 63/343,567, filed on May 19, 2022.

(51) Int. Cl.
*H04L 12/40* (2006.01)
*H04L 12/66* (2006.01)

(52) U.S. Cl.
CPC ........ *H04L 12/40123* (2013.01); *H04L 12/66* (2013.01); *H04L 2012/40273* (2013.01)

(58) Field of Classification Search
CPC .............. H04L 12/40123; H04L 12/66; H04L 2012/40273; H04L 67/12; H04L 67/289; H04L 67/56; H04L 67/566; H04L 67/10

(Continued)

(56) References Cited

U.S. PATENT DOCUMENTS

| 8,099,778 B2 | 1/2012 | Courtin |
| 9,799,196 B1 * | 10/2017 | Boushehri ................ B60Q 9/00 |

(Continued)

FOREIGN PATENT DOCUMENTS

| RU | 2207593 C1 | 6/2003 |
| WO | 2006012730 A1 | 2/2006 |
| WO | 2022010787 A1 | 1/2022 |

OTHER PUBLICATIONS

EESR reported Oct. 17, 2023.
EESR reported on Oct. 16, 2023.
EESR mailed on Oct. 19, 2023.

*Primary Examiner* — Michael Thier
(74) *Attorney, Agent, or Firm* — Lawrence Xin-Tao Yu

(57) ABSTRACT

Systems and methods for collecting telematics data from telematics devices are provided. A fleet management server includes a first and second data store operable to store a first and second set of telematics data associated with a first and second group of telematics devices. A plurality of gateway servers includes a first and second group of gateway servers in communication with the first and second group of telematics devices. The first and second group of gateway servers include at least one common gateway server. A unified downloader is operable to establish a communication channel between each gateway server in the first and second group of gateway servers and the unified downloader such that a single communication channel is established to each common gateway server. The communication channels can be multiplexed and transport asynchronous streams of telematics data. An event bus registers event records for the fleet management and gateway servers.

19 Claims, 9 Drawing Sheets

(58) Field of Classification Search
USPC ........................................................ 370/252
See application file for complete search history.

(56) References Cited

U.S. PATENT DOCUMENTS

| | | | |
|---|---|---|---|
| 11,190,373 B1 | 11/2021 | Stevenson et al. | |
| 11,370,391 B1 | 6/2022 | Gammelgard | |
| 11,587,130 B1 | 2/2023 | Gross | |
| 12,000,940 B1* | 6/2024 | Lloyd | F24S 50/20 |
| 2004/0185842 A1 | 9/2004 | Spaur | |
| 2006/0022842 A1* | 2/2006 | Zoladek | G07C 5/008 |
| | | | 340/870.07 |
| 2008/0012725 A1* | 1/2008 | Zoladek | G07C 5/008 |
| | | | 340/870.07 |
| 2013/0257344 A1 | 10/2013 | Millet et al. | |
| 2015/0246654 A1* | 9/2015 | Tadic | G01P 15/02 |
| | | | 340/436 |
| 2015/0276416 A1 | 10/2015 | Yamasaki | |
| 2015/0338226 A1 | 11/2015 | Mason | |
| 2015/0349977 A1 | 12/2015 | Risse | |
| 2016/0055116 A1 | 2/2016 | Duer | |
| 2016/0086391 A1 | 3/2016 | Ricci | |
| 2016/0110929 A1 | 4/2016 | Park | |
| 2016/0117868 A1* | 4/2016 | Mitchell | H04L 63/0428 |
| | | | 701/32.3 |
| 2016/0334227 A1 | 11/2016 | Davidson | |
| 2018/0075670 A1 | 3/2018 | Rajakondala et al. | |
| 2019/0279440 A1 | 9/2019 | Ricci | |
| 2020/0088534 A1 | 3/2020 | Nakirikanti | |
| 2021/0072968 A1 | 3/2021 | Mezaael | |
| 2021/0349636 A1 | 11/2021 | Gold | |
| 2021/0349657 A1 | 11/2021 | Darji | |
| 2022/0005609 A1* | 1/2022 | Morizumi | G08G 1/22 |
| 2022/0232649 A1* | 7/2022 | Kobel | H04W 8/005 |
| 2022/0353732 A1* | 11/2022 | Filippou | H04W 28/0289 |
| 2023/0061842 A1 | 3/2023 | Gibson | |
| 2023/0120395 A1 | 4/2023 | Sanchez | |
| 2023/0144456 A1 | 5/2023 | Ferguson | |
| 2023/0146426 A1 | 5/2023 | Sanchez | |
| 2023/0286414 A1* | 9/2023 | Malik | H04W 52/0254 |
| 2023/0344847 A1* | 10/2023 | Hamada | B60R 16/023 |

* cited by examiner

*700

*710 *720 *730

| Subject | Event | Timestamp |
|---|---|---|
| Device Connection | G1 connected to GS1 | 2022-01-05 10:45 |
| Data Permission | D1 allowed to access to G1 | 2022-01-05 10:56 |
| Device Connection | G1 connected to GS2 | 2022-01-05 10:57 |
| Data Permission | D2 allowed to access to G1 | 2022-01-05 10:59 |
| ⋮ | ⋮ | ⋮ |

FIG. 7

SYSTEMS AND METHODS FOR COLLECTING TELEMATICS DATA FROM TELEMATICS DEVICES

CROSS-REFERENCE TO RELATED APPLICATIONS

This application claims priority to U.S. Provisional Patent Application No. 63/343,567 filed May 19, 2022 and titled "SYSTEMS AND METHODS FOR COLLECTING TELEMATICS DATA FROM TELEMATICS DEVICES", the contents of which are incorporated herein by reference for all purposes.

FIELD

The embodiments described herein generally relate to telematics devices, and in particular, to collecting telematics data from telematics devices.

BACKGROUND

The following is not an admission that anything discussed below is part of the prior art or part of the common general knowledge of a person skilled in the art.

Telematics devices can gather telematics data from various assets, such as, but not limited to, vehicles. However, it can be difficult to retrieve, store, and process the telematics data at scale. Current approaches to server and network architecture may not provide sufficient capacity to deal with large volumes of telematics data. As telematics devices continue to evolve and become more prevalent, the quantity of telematics data generated will continue to increase, and these challenges will be exacerbated. Improved server and network architectures may be required to collect telematics data at these larger scales.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with a broad aspect, there is provided a system for collecting telematics data from a plurality of telematics devices. The plurality of telematics devices includes a first and second group of telematics devices. The telematics data includes a first set of telematics data associated with the first group of telematics devices and a second set of telematics data associated with the second group of telematics devices. The system includes: a fleet management server, a plurality of gateway servers, and a unified downloader. The fleet management server includes a first and second data store. The first data store is operable to store the first set of telematics data associated with the first group of telematics devices. The second data store is operable to store the second set of telematics data associated with the second group of telematics devices. The plurality of gateway servers is in communication with the plurality of telematics devices. The plurality of gateway servers includes a first and second group of gateway servers. The first group of gateway servers is in communication with the first group of telematics devices. The second group of gateway servers is in communication with the second group of telematics devices. The first and second group of gateway servers includes at least one common gateway server. The unified downloader is associated with the fleet management server. The unified downloader is operable to establish a plurality of communication channels. The plurality of communication channels includes a communication channel between each gateway server in the first and second group of gateway servers and the unified downloader such that a single communication channel is established to each common gateway server, whereby the first and second set of telematics data are receivable through the plurality of communication channels.

In some embodiments, each single communication channel to each common gateway server can be multiplexed to transport at least a portion of both the first and second set of telematics data.

In some embodiments, each common gateway server can be operable to transmit at least a portion of both the first and second set of telematics data through the corresponding single communication channel as asynchronous streams.

In some embodiments, the unified downloader can be executed remotely from the fleet management server.

In some embodiments, the unified downloader can be operable to establish a communication channel between the unified downloader and the fleet management server to transport the first and second set of telematics data from the unified downloader to the fleet management server.

In some embodiments, the plurality of gateway servers can include one or more backup data stores operable to store the telematics data from the plurality of telematics devices.

In some embodiments, the unified downloader can be operable to transmit a receipt confirmation in response to receiving a portion of the telematics data from a gateway server, and the gateway server can be operable to delete the portion of the telematics data from the backup data store in response to the receipt confirmation.

In some embodiments, each gateway server can include a plurality of network sockets, and each communication channel can be connected to a network socket of the corresponding gateway server.

In some embodiments, the first and second group of telematics devices can include at least one common telematics device.

In some embodiments, the plurality of telematics devices can be installed in a plurality of vehicles, and the telematics data can include vehicle data collected from the plurality of vehicles.

In accordance with a broad aspect, there is provided a method for collecting telematics data from a plurality of telematics devices. The plurality of telematics devices includes a first and second group of telematics devices. The telematics data includes a first set of telematics data associated with the first group of telematics devices and a second set of telematics data associated with the second group of telematics devices. The method involves: providing, at a fleet management server, a first and second data store, the first data store operable to store the first set of telematics data associated with the first group of telematics devices, the second data store operable to store the second set of telematics data associated with the second group of telematics devices; identifying, from a plurality of gateway servers in communication with the plurality of telematics devices, a first and second group of gateway servers, the first group of gateway servers being in communication with the first group of telematics devices, the second group of gateway servers being in communication with the second group of telematics devices, the first and second group of gateway servers including at least one common gateway server; and establishing, by a unified downloader associated with the fleet management server, a plurality of communication channels, the plurality of communication channels including a communication channel between each gateway server in the first and second group of gateway servers and the unified downloader such that a single communication channel is established to each common gateway server; and receiving, through the plurality of communication channels, the first and second set of telematics data; and storing the first set of telematics data at the first data store and the second set of telematics data at the second data store.

In some embodiments, each single communication channel to each common gateway server can be multiplexed to transport at least a portion of both the first and second set of telematics data.

In some embodiments, at least a portion of both the first and second set of telematics data can be transmitted through the corresponding single communication channel as asynchronous streams.

In some embodiments, the unified downloader can be executed remotely from the fleet management server.

In some embodiments, the method can further involve: establishing a communication channel between the unified downloader and the fleet management server to transport the first and second set of telematics data from the unified downloader to the fleet management server.

In some embodiments, the plurality of gateway servers can include one or more backup data stores operable to store the telematics data from the plurality of telematics devices.

In some embodiments, the method can further involve: transmitting, by the unified downloader, a receipt confirmation in response to receiving a portion of the telematics data from a gateway server; and deleting, at the one or more back up data stores, the portion of the telematics data in response to the receipt confirmation.

In some embodiments, each gateway server can include a plurality of network sockets, and each communication channel can be connected to a network socket of the corresponding gateway server.

In some embodiments, the first and second group of telematics devices can include at least one common telematics device.

In some embodiments, the plurality of telematics devices can be installed in a plurality of vehicles, and the telematics data can include vehicle data collected from the plurality of vehicles.

In accordance with a broad aspect, there is provided a method for collecting telematics data from a plurality of telematics devices. The method involves: receiving, at a gateway server in communication with a telematics device, a request to receive a set of telematics data associated with the telematics device, the request being associated with a data store at a fleet management server; determining, based on a first event record registered at an event bus in communication with the gateway server, that the data store does not have permission to receive the set of telematics data associated with the telematics device; in response to determining that the data store does not have permission to receive the set of telematics data associated with the telematics device, determining whether the request satisfies at least one permission modification criteria; in response to determining that that the request does satisfy the at least one permission modification criteria: registering, at the event bus, a second event record indicating that the data store has permission to receive the set of telematics data associated with the telematics device; and transmitting the set of telematics data associated with the telematics device from the gateway server to the fleet management server, thereby granting the request; and in response to determining that the request does not satisfy the at least one permission modification criteria, denying the request.

In some embodiments, the at least one permission modification criteria can be satisfied if another request associated with another data store to receive the set of telematics data associated with the telematics device was not received within a predetermined time period.

In some embodiments, the at least one permission modification criteria can not satisfied if another request associated with another data store to receive the set of telematics data associated with the telematics device was received within a predetermined time period.

In some embodiments, the method can further involve: receiving, at the gateway server, another request to receive the set of telematics data associated with the telematics device, the other request being associated with another data store; and determining, based on the second event record, that the other data store does not have permission to receive the set of telematics data associated with the telematics device.

In some embodiments, the event record can include a timestamp representing when the data store was granted permission to receive the set of telematics data associated with the telematics device.

In some embodiments, the method can further involve: determining whether the fleet management server is connected to the gateway server; and in response to determining that that the fleet management server is not connected to the gateway server, establishing a communication channel between the fleet management server and the gateway server.

In some embodiments, the communication channel can be multiplexed so that telematics data associated with at least two data stores at the fleet management server are receivable through the same communication channel.

In some embodiments, the method can further involve: identifying, at the fleet management server, the gateway server in communication with the telematics device based on a third event record registered at the event bus indicating that the telematics device is connected to the gateway server.

In some embodiments, the method can further involve: receiving, at the fleet management system, a plurality of event records from the event bus, each event record indicating that one data store has permission to receive the set of telematics data associated with one telematics device.

In some embodiments, the plurality of telematics devices is installed in a plurality of vehicles, and the telematics data can include vehicle data collected from the plurality of vehicles.

In accordance with a broad aspect, there is provided a system for collecting telematics data from a plurality of telematics devices. The system includes: a plurality of fleet management servers, a plurality of gateway servers, and an event bus. The plurality of fleet management servers includes a plurality of data stores. Each data store is operable to store one or more sets of telematics data associated with one or more telematics devices. The plurality of gateway servers is in communication with the plurality of telematics devices. The event bus is in communication with the plurality of gateway servers. The event bus is operable to register a plurality of event records. In operation, a gateway server in communication with a telematics device: receives a request to receive a set of telematics data associated with the telematics device, the request being associated with a data store at a fleet management server; determines, based on a first event record registered at the event, that the data store does not have permission to receive the set of telematics data associated with the telematics device; in response to determining that the data store does not have permission to receive the set of telematics data associated with the telematics device, determines whether the request satisfies at least one permission modification criteria; in response to determining that that the request does satisfy the at least one permission modification criteria: registers, at the event bus, a second event record indicating that the data store has permission to receive the set of telematics data associated with the telematics device; and transmits the set of telematics data associated with the telematics device to the fleet management server, thereby granting the request; and in response to determining that the request does not satisfy the at least one permission modification criteria, denies the request.

In some embodiments, the at least one permission modification criteria can be satisfied if another request associated with another data store to receive the set of telematics data associated with the telematics device was not received within a predetermined time period.

In some embodiments, the at least one permission modification criteria can not satisfied if another request associated with another data store to receive the set of telematics data associated with the telematics device was received within a predetermined time period.

In some embodiments, in operation, the gateway server can: receive another request to receive the set of telematics data associated with the telematics device, the other request being associated with another data store; and determine, based on the second event record, that the other data store does not have permission to receive the set of telematics data associated with the telematics device.

In some embodiments, the event record can include a timestamp representing when the data store was granted permission to receive the set of telematics data associated with the telematics device.

In some embodiments, in operation, the gateway server can: determine whether the fleet management server is connected to the gateway server; and in response to determining that that the fleet management server is not connected to the gateway server, establish a communication channel between the fleet management server and the gateway server.

In some embodiments, the communication channel can be multiplexed so that telematics data associated with at least two data stores at the fleet management server are receivable through the same communication channel.

In some embodiments, in operation, the fleet management server can: identify the gateway server in communication with the telematics device based on a third event record registered at the event bus indicating that the telematics device is connected to the gateway server.

In some embodiments, in operation, the fleet management server can: receive a plurality of event records from the event bus, each event record indicating that one data store has permission to receive the set of telematics data associated with one telematics device.

In some embodiments, the plurality of telematics devices can be installed in a plurality of vehicles, and the telematics data can include vehicle data collected from the plurality of vehicles.

In accordance with a broad aspect, there is provided method for collecting telematics data from a plurality of telematics devices. The method involves: providing, at a plurality of fleet management servers, a plurality of data stores, each data store associated with at least one telematics device, each data store operable to store a set of telematics data associated with the at least one telematics device; detecting, at a gateway server, a connection by a telematics device to the gateway server; registering, at an event bus in communication with the gateway server, an event record indicating that the telematics device is connected to the gateway server; for each fleet management server having at least one data store associated with the telematics device: identifying, at the fleet management server, the gateway server in communication with the telematics device based on the event record; receiving, at the fleet management server, a set of telematics data associated with the telematics device from the gateway server; and storing, at the at least one data store, the set of telematics data associated with the telematics device.

In some embodiments, the method can further involve: receiving, at the fleet management server, the event record from the event bus; and updating, at the fleet management server, a mapping of the plurality of telematics devices to the plurality of gateways based on the event record. The gateway server can be identified based on the mapping.

In some embodiments, the method can further involve: identifying, based on the mapping, at least one gateway server connected to the fleet management system that is not connected to any telematics devices associated with any data stores at the fleet management system; and terminating a communication channel between the fleet management server and the gateway server.

In some embodiments, the method can further involve: determining whether the fleet management server is connected to the gateway server; and in response to determining that that the fleet management server is not connected to the gateway server, establishing a communication channel between the fleet management server and the gateway server.

In some embodiments, the communication channel can be multiplexed so that telematics data associated with at least two data stores at the fleet management server are receivable through the same communication channel.

In some embodiments, the event record can include a timestamp representing when the connection by the telematics device to the gateway server was established.

In some embodiments, the gateway server can be a second gateway server, the event record can be a second event record, and the method can further involve: prior to detecting the connection by the telematics device to the second gateway server, detecting, at a first gateway server, a connection by the telematics device to the first gateway server; registering, at the event bus, a first event record indicating that the telematics device is connected to the first gateway server; and identifying, at the fleet management server, the second gateway server in communication with the telematics device based on the first and second event records.

In some embodiments, the method can further involve: receiving, at each fleet management server, a plurality of event records from the event bus, each event record indicating that one telematics device is connected to one gateway server.

In some embodiments, the method can further involve: prior to receiving the set of telematics data associated with the telematics device from the gateway server at the fleet management server, determining that the at least one data store has permission to receive the set of telematics data associated with the telematics device based on another event record registered at the event bus.

In some embodiments, the plurality of telematics devices can be installed in a plurality of vehicles, and the telematics data can include vehicle data collected from the plurality of vehicles.

In accordance with a broad aspect, there is provided a system for collecting telematics data from a plurality of telematics devices. The system includes: a plurality of fleet management servers, a plurality of gateway servers, and an event bus. The plurality of fleet management servers includes a plurality of data stores. Each data store is associated with at least one telematics device. Each data store is operable to store a set of telematics data associated with the at least one telematics device. The plurality of gateway servers is in communication with the plurality of telematics devices. The event bus is in communication with the plurality of gateway servers and the plurality of fleet management servers. The event bus is operable to register a plurality of event records. In operation: a gateway server detects a connection by a telematics device to the gateway server; the event bus registers an event record indicating that the telematics device is connected to the gateway server; for each fleet management server having at least one data store associated with the telematics device, the fleet management server: identifies the gateway server in communication with the telematics device based on the event record; receives a set of telematics data associated with the telematics device from the gateway server; and stores the set of telematics data associated with the telematics device at the at least one data store.

In some embodiments, in operation, the fleet management server can: receive the event record from the event bus; update a mapping of the plurality of telematics devices to the plurality of gateways based on the event record; and identify the gateway server in communication with the telematics device based on the mapping.

In some embodiments, in operation, the fleet management server can: identify, based on the mapping, at least one gateway server connected to the fleet management system that is not connected to any telematics devices associated with any data stores at the fleet management system; and terminate a communication channel between the fleet management server and the gateway server.

In some embodiments, in operation, the fleet management server can: determine whether the fleet management server is connected to the gateway server; and in response to determining that that the fleet management server is not connected to the gateway server, establish a communication channel between the fleet management server and the gateway server.

In some embodiments, the communication channel can be multiplexed so that telematics data associated with at least two data stores at the fleet management server are receivable through the same communication channel.

In some embodiments, the event record can include a timestamp representing when the connection by the telematics device to the gateway server was established.

In some embodiments, the gateway server can be a second gateway server, the event record can be a second event record, and, in operation: prior to detecting the connection by the telematics device to the second gateway server, a first gateway server can detect a connection by the telematics device to the first gateway server; the event bus can register a first event record indicating that the telematics device is connected to the first gateway server; and the fleet management server can identify the second gateway server in communication with the telematics device based on the first and second event records.

In some embodiments, each fleet management server can be operable to receive a plurality of event records from the event bus, each event record indicating that one telematics device is connected to one gateway server.

In some embodiments, in operation, prior to receiving the set of telematics data associated with the telematics device from the gateway server at the fleet management server, the gateway server can determine that the at least one data store has permission to receive the set of telematics data associated with the telematics device based on another event record registered at the event bus.

In some embodiments, the plurality of telematics devices can be installed in a plurality of vehicles, and the telematics data can include vehicle data collected from the plurality of vehicles.

In accordance with a broad aspect, there is provided a non-transitory computer readable medium having instructions stored thereon executable by at least one processor to implement any of the methods described herein.

BRIEF DESCRIPTION OF THE DRAWINGS

Several embodiments will be described in detail with reference to the drawings, in which:

FIG. 7 is a table of example event records that can be registered at an event bus, in accordance with an embodiment;

Figure 1:
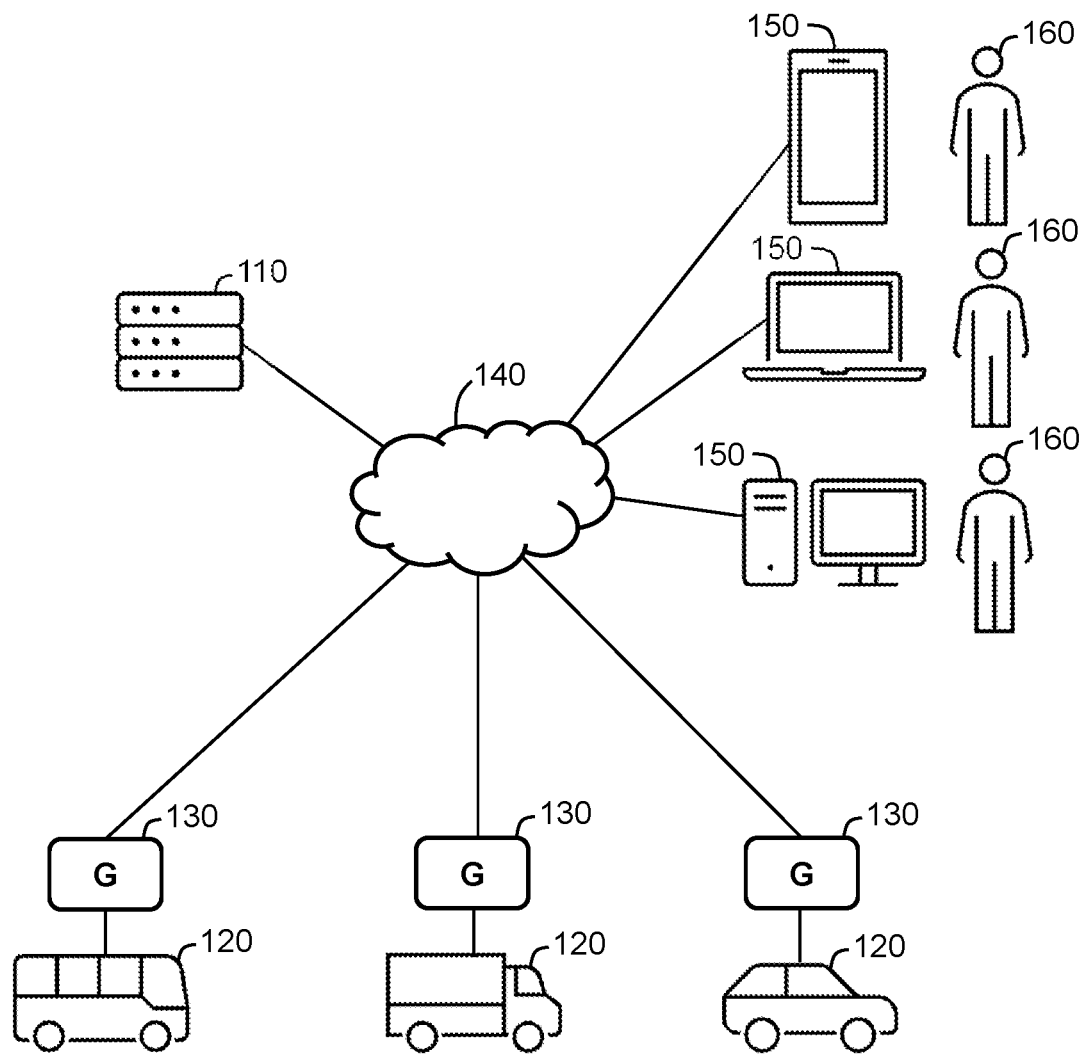
FIG. 1 is a block diagram of various components interacting with an example fleet management system, in accordance with an embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DETAILED DESCRIPTION

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Referring to FIG. 1, there is shown an example fleet management system 110 for managing a plurality of assets equipped with a plurality of telematics devices 130. In operation, the telematics devices 130 can gather various data associated with the assets (i.e., telematics data) and share the telematics data with the fleet management system 110. The fleet management system 110 can be remotely located from the telematics devices 130 and the assets.

For ease of exposition, various examples will now be described in which the assets are vehicles 120. However, it should be appreciated that the systems and methods described herein may be used to manage other forms of assets in some embodiments. Such assets can generally include any apparatuses, articles, machines, and/or equipment that can be equipped and monitored by the telematics devices 130. For example, other assets may include shipping containers, trailers, construction equipment, generators, and the like. The nature and format of the telematics data may vary depending on the type of asset.

The vehicles 120 may include any machines for transporting goods or people. The vehicles 120 can include motor vehicles, such as, but not limited to, motorcycles, cars, trucks, and/or buses. The motor vehicles can be gas, diesel, electric, hybrid, and/or alternative fuel. In some cases, the vehicles 120 may include other kinds of vehicles, such as, but not limited to, railed vehicles (e.g., trains, trams), watercraft (e.g., ships, boats), aircraft (e.g., airplanes, helicopters), and/or spacecraft. Each vehicle 120 can be equipped with a telematics device 130. Although only three vehicles 120 having three telematics devices 130 are shown in the illustrated example for ease of illustration, it should be appreciated that there can be any number of vehicles 120 and telematics devices 130. In some cases, the fleet management system 110 may manage hundreds, thousands, or even millions of vehicles 120 and telematics devices 130.

The telematics devices 130 can be standalone devices that are removably installed in the vehicles 120. Alternatively, the telematics devices 130 can be integrated components that are integral with the vehicles 120. The telematics devices 130 can gather various telematics data from the vehicles 120 and share the telematics data with the fleet management system 110. The telematics data may include any information, parameters, attributes, characteristics, and/or features associated with the vehicles 120. For example, the telematics data can include, but is not limited to, location data, speed data, acceleration data, engine data, brake data, transmission data, fluid data (e.g., oil, coolant, and/or washer fluid), energy data (e.g., battery and/or fuel level), odometer data, vehicle identifying data, error/diagnostic data, tire data, seatbelt data, and/or airbag data. In some cases, the telematics data may include information related to the telematics devices 130 and/or other devices associated with the telematics devices 130.

The fleet management system 110 can process the telematics data collected from the telematics devices 130 to provide various analysis, predictions, and reporting. For example, the fleet management system 110 can process the telematics data to gain additional information regarding the vehicles 120, such as, but not limited to, trip distances/times, idling times, harsh braking/driving, usage rate, and/or fuel economy.

Various data analytics and machine learning techniques may be used by the fleet management system 110 to process the telematics data. The telematics data can then be used to manage various aspects of the vehicles 120, such as, but not limited to, route planning, vehicle maintenance, driver compliance, asset utilization, and/or fuel management. In this manner, the fleet management system 110 can improve the productivity, efficiency, safety, and/or sustainability of the vehicles 120.

A plurality of computing devices 150 can provide access to the fleet management system 110 to a plurality of users 160. This may allow the users 160 to manage and track the vehicles 120, for example, using various telematics data collected and/or processed by the fleet management system 110. The computing devices 150 can be any computers, such as, but not limited to, personal computers, portable computers, wearable computers, workstations, desktops, laptops, smartphones, tablets, smartwatches, PDAs (personal digital assistants), and/or mobile devices. The computing devices 150 can be remotely located from the fleet management system 110, telematics devices 130, and vehicles 120. Although only three computing devices 150 operated by three users 160 are shown in the illustrated example for ease of illustration, it should be appreciated that there can be any number of computing devices 150 and users 160. In some cases, the fleet management system 110 may service hundreds, thousands, or even millions of computing devices 150 and users 160.

The fleet management system 110, telematics devices 130, and computing devices 150 can communicate through one or more networks 140. The networks 140 may be wireless, wired, or a combination thereof. The networks 140 may employ any communication protocol and utilize any communication medium. For example, the networks 140 may include, but is not limited to, Wi-Fi™ networks, Ethernet networks, Bluetooth™ networks, NFC (near-field communication) networks, radio networks, cellular networks, and/or satellite networks. The networks 140 may be private, public, or a combination thereof. For example, the networks 140 may include, but is not limited to, LANs (local area networks), WANs (wide area networks), and/or the Internet. The networks 140 may also facilitate communication with other devices and systems that are not shown.

The fleet management system 110 can be implemented using one or more computers. For example, the fleet management system 110 may be implemented using one or more computer servers. The servers can be distributed across a wide geographical area. In some embodiments, the fleet management system 110 may be implemented using a cloud computing platform, such as Google Cloud Platform™ or Amazon Web Services™. In other embodiments, the fleet management system 110 may be implemented using one or more dedicated computer servers.

Figure 2:
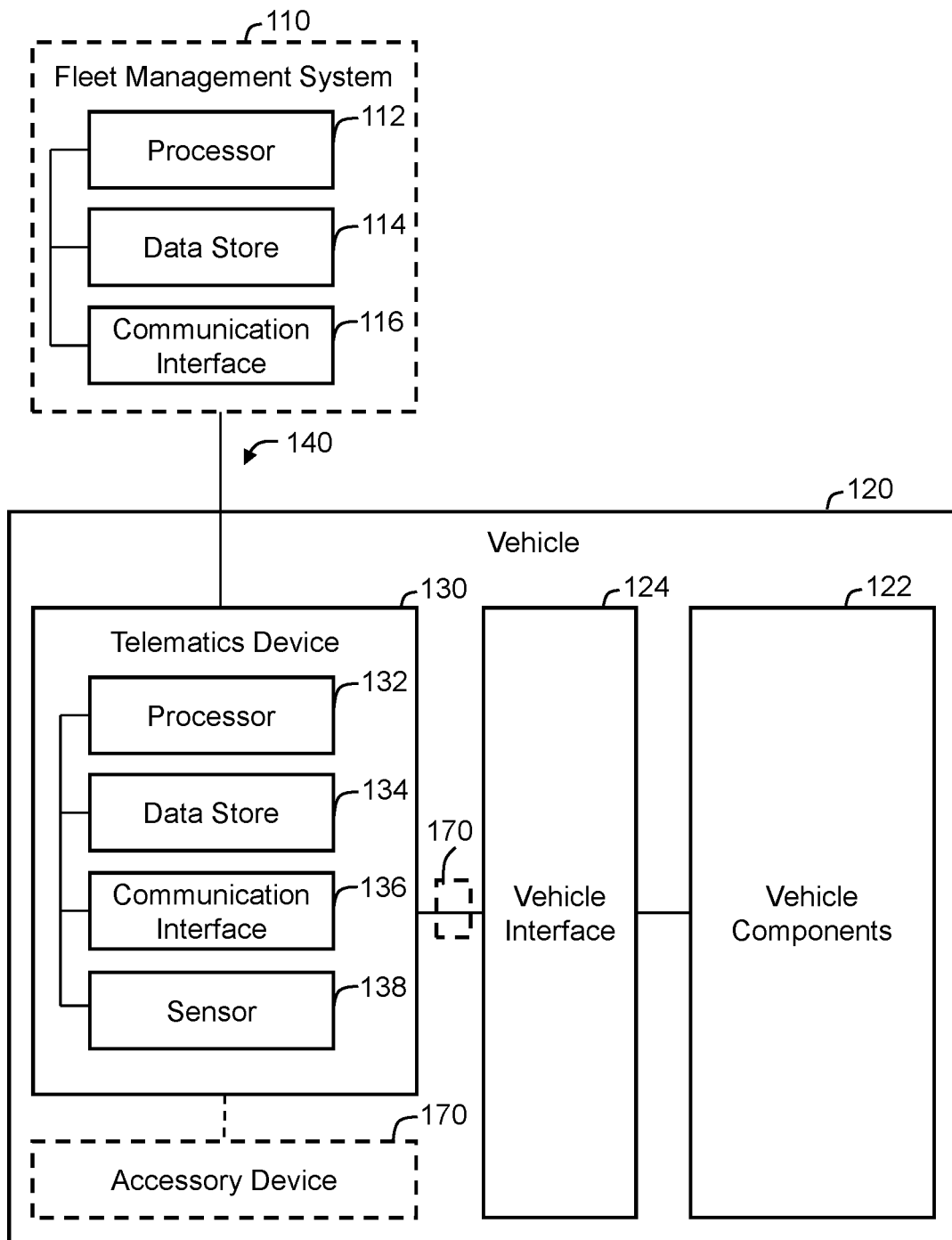
FIG. 2 is a block diagram of an example fleet management system interacting with an example telematics device and example vehicle, in accordance with an embodiment.

Reference will now be made to FIG. 2 to further explain the operation of the fleet management system 110, telematics devices 130, and vehicles 120. In the illustrated example, the fleet management system 110 in communication with a telematics device 130 that is installed in a vehicle 120.

As shown, the fleet management system 110 can include one or more processors 112, one or more data storages 114, and one or more communication interfaces 116. Each of these components may communicate with each other. Each of these components may be combined into fewer components or divided into additional subcomponents. Two or more of these components and/or subcomponents may be distributed across a wide geographical area.

The processors 112 can control the operation of the fleet management system 110. The processors 112 can be implemented using any suitable processing devices or systems, such as, but not limited to, CPUs (central processing units), GPUs (graphics processing units), FPGAs, (field programmable gate arrays), ASICs (application specific integrated circuits), DSPs (digital signal processors), NPUs (neural processing units), QPUs (quantum processing units), microprocessors, and/or controllers. The processors 112 can execute various computer instructions, programs, and/or software stored on the data storage 114 to implement various methods described herein. For example, the processors 112 may process various telematics data collected by the fleet management system 110 from the telematics device 130.

The data storages 114 can store various data for the fleet management system 110. The data storages 114 can be implemented using any suitable data storage devices or systems, such as, but not limited to, RAM (random access memory), ROM (read only memory), flash memory, HDD (hard disk drives), SSD (solid-state drives), magnetic tape drives, optical disc drives, and/or memory cards. The data storages 114 may include volatile memory, non-volatile memory, or a combination thereof. The data storages 114 may include non-transitory computer readable media. The data storages 114 can store various computer instructions, programs, and/or software that can be executed by the processors 112 to implement various methods described herein. The data storages 114 may store various telematics data collected from the telematics device 130 and/or processed by the processors 112.

The communication interfaces 116 can enable communication between the fleet management system 110 and other devices or systems, such as the telematics device 130. The communication interfaces 116 can be implemented using any suitable communication devices or systems. For example, the communication interfaces 116 may include various physical connectors, ports, or terminals, such as, but not limited to, USB (universal serial bus), Ethernet, Thunderbolt, Firewire, SATA (serial advanced technology attachment), PCI (peripheral component interconnect), HDMI (high-definition multimedia interface), and/or DisplayPort. The communication interfaces 116 can also include various wireless interface components to connect to wireless networks, such as, but not limited to, Wi-Fi™, Bluetooth™, NFC, cellular, and/or satellite. The communication interfaces 116 can enable various inputs and outputs to be received at and sent from the fleet management system 110. For example, the communication interfaces 116 may be used to retrieve telematics data from the telematics device 130.

As shown, the telematics device 130 also can include one or more processors 132, one or more data storages 134, and one or more communication interfaces 136. Additionally, the telematics device 130 can include one or more sensors 138. Each of these components may communicate with each other. Each of these components may be combined into fewer components or divided into additional subcomponents.

The processors 132 can control the operation of the telematics device 130. Like the processors 112 of the fleet management system 110, the processors 132 of the telematics device 130 can be implemented using any suitable processing devices or systems. The processors 132 can execute various computer instructions, programs, and/or software stored on the data storages 134. For example, the processors 132 can process various telematics data gathered from the vehicle components 142 or the sensors 138.

The data storages 134 can store various data for the telematics device 130. Like the data storages 114 of the fleet management system 110, the data storages 134 of the telematics device 130 can be implemented using any suitable data storage devices or systems. The data storages 134 can store various computer instructions, programs, and/or software that can be executed by the processors 132. The data storages 134 can also store various telematics data gathered from the vehicle components 142 or the sensors 138.

The communication interfaces 136 can enable communication between the telematics device 130 and other devices or systems, such as the fleet management system 110 and vehicle components 142. Like the communication interfaces 116 of the fleet management system 110, the communication interfaces 136 of the telematics device 130 can be implemented using any suitable communication devices or systems. The communication interfaces 136 can enable various inputs and outputs to be received at and sent from the telematics device 130. For example, the communication interfaces 136 may be used collect telematics data from the vehicle components 142 and sensors 138 or to send telematics data to the fleet management system 110. The communication interfaces 136 can also be used to connect the telematics device 130 with one or more accessory devices 170.

The sensors 138 can detect and/or measure various environmental events and/or changes. The sensors 138 can include any suitable sensing devices or systems, including, but not limited to, location sensors, velocity sensors, acceleration sensors, orientation sensors, vibration sensors, proximity sensors, temperature sensors, humidity sensors, pressure sensors, optical sensors, and/or audio sensors. When the telematics device 130 is installed in the vehicle 120, the sensor 138 can be used to gather telematics data that may not be obtainable from the vehicle components 142. For example, the sensors 138 may include a satellite navigation device, such as, but not limited to, a GPS (global positioning system) receiver, which can measure the location of the vehicle 120. As another example, the sensor 138 may include accelerometers, gyroscopes, magnetometers, and/or IMUs (inertial measurement units), which can measure the acceleration and/or orientation of the vehicle 120.

In some cases, the telematics device 130 may operate in conjunction with one or more accessory devices 170 that are in communication with the telematics device 130. The accessory devices 170 can include expansion devices that can provide additional functionality to the telematics device 130. For example, the accessory devices 170 may provide additional processing, storage, communication, and/or sensing functionality through one or more additional processors, data storages, communication interfaces, and/or sensors (not shown). The accessory devices 170 can also include adapter devices that facilitate communication between the communication interface 136 and the vehicle interfaces 124, such as a cable harness.

The telematics device 130 can be installed within the vehicle 120, removably or integrally. One or more accessory devices 170 can also be installed in the vehicle 120 along with the telematics device 130. As shown, the vehicle 120 can include one or more vehicle components 122 and one or more vehicle interfaces 124. Each of these components may be combined into fewer components or divided into additional subcomponents.

The vehicle components 122 can include any subsystems, parts, and/or subcomponents of the vehicle 120. The vehicle components 122 can be used to operate and/or control the vehicle 120. For example, the vehicle components 122 can include, but are not limited to, powertrains, engines, transmissions, steering, braking, seating, batteries, doors, and/or suspensions. The telematics device 130 can gather various telematics data from the vehicle components 122. For example, the telematics device 130 may communicate with one or more ECUs (electronic control units) that control the vehicle components 142 and/or one or more internal vehicle sensors.

The vehicle interfaces 124 can facilitate communication between the vehicle components 122 and other devices or systems. The vehicle interfaces 124 can include any suitable communication devices or systems. For example, the vehicle interfaces 124 may include, but is not limited to, ODB-II (on-board diagnostics) ports and/or CAN (controller area network) buses. The vehicle interfaces 124 can be used by the telematics device 130 to gather telematics data from the vehicle components 122. For example, the communication interfaces 136 of the telematics device 130 can be connected to the vehicle interfaces 124 to communicate with the vehicle components 122. In some cases, an accessory device 170, such as a wire harness, can provide the connection between the communication interface 136 and the vehicle interface 124.

Figure 3:
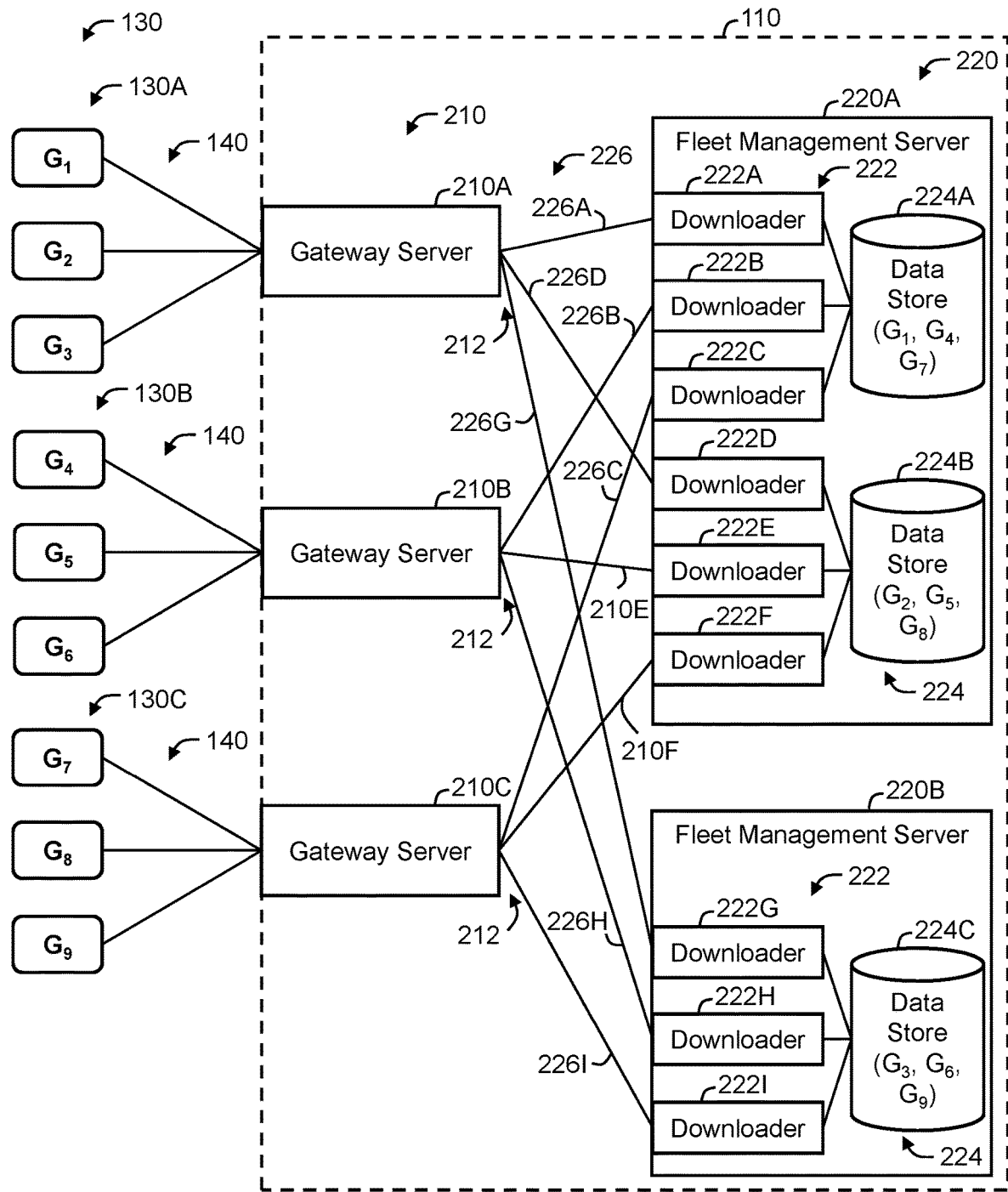
FIG. 3 is a block diagram of an example fleet management system interacting with a plurality of telematics devices, in accordance with an embodiment.

Reference will now be made to FIG. 3, which illustrates an example implementation of the fleet management system 110. As shown, the fleet management system 110 can include one or more gateway servers 210 and one or more fleet management servers 220. In operation, the gateway servers 210 can receive telematics data from the telematics devices 130 and route the telematics data to the fleet management servers 220. The fleet management servers 220 can store and process the telematics data.

The gateway servers 210 and fleet management servers 220 can be implemented using various computers. In some embodiments, the gateway servers 210 and fleet management servers 220 may be implemented using dedicated server computers. In other embodiments, the gateway servers 210 and fleet management servers 220 may be implemented using a cloud computing platform. In some cases, two or more gateway servers 210 and/or fleet management servers 220 may be implemented using a single computer. For example, two or more gateway servers 210 and/or fleet management servers 220 may be implemented using multiple virtual machines, containers, or other virtualizations running on the same computer.

In the illustrated example, the gateway servers 210 include a first gateway server 210A, a second gateway server 210B, and a third gateway server 210C, and the fleet management servers 220 include a first fleet management server 220A and a second fleet management server 220B. However, it should be appreciated that the fleet management system 110 may include any number of gateway servers 210 and fleet management servers 220. In some cases, the fleet management system 110 may include a single gateway server 210 and/or a single fleet management server 220.

A plurality of telematics devices 130 can communicate with the fleet management system 110 through the gateway servers 210. Each telematics device 130 can connect to one of the gateway servers 210 and each gateway server 210 can be in communication with one or more telematics devices 130. In the illustrated example, the first gateway server 210A is in communication with a first plurality of telematics devices 130A, the second gateway server 210B is in communication with a second plurality of telematics devices 130B, and the third gateway server 210C is in communication with a third plurality of telematics devices 130C. One or more networks 140 can facilitate the communication between the telematics devices 130 and the gateway servers 210.

Each gateway server 210 can receive telematics data from the telematics devices 130 that are connected to that gateway server 210. In the illustrated example, the first gateway server 210A can receive telematics data from the first plurality of telematics devices 130A, the second gateway server 210B can receive telematics data from the second plurality of telematics devices 130B, and the third gateway server 210C can receive telematics data from the third plurality of telematics devices 130C. Each gateway server 210 can transmit the received telematics data to one or more fleet management servers 220.

Each fleet management server 220 can include one or more data stores 224. In the illustrated example, the first fleet management server 220A includes a first data store 224A and a second data store 224B, and the second fleet management server 220B includes a third data store 224C. However, it should be appreciated each fleet management server 220 may include any number of data stores 224.

Each data store 224 can be associated with one or more telematics devices 130 and store telematics data retrieved from those telematics devices 130. For example, each data store 224 can correspond to a fleet of vehicles 120 and store telematics data retrieved from telematics devices 130 installed in those vehicles 120. Each data store 224 can also be associated with a tenant, or group of users 160, who are permitted to access the telematics data stored on the data store 224. For example, a tenant may be a group of users 160 belonging to a particular fleet management entity, such as, but not limited to, a trucking company, car rental company, package delivery company, public transportation company, insurance company, etc. The fleet management system 110 may include hundreds, thousands, or even millions of data stores 224 corresponding to different tenants and/or fleets of vehicles 120.

In the illustrated example, the first data store 224A is associated with telematics devices $G_1$, $G_4$, and $G_7$, the second data store 224B is associated with telematics devices $G_2$, $G_5$, and $G_8$, and the third data store 224C is associated with telematics devices $G_3$, $G_6$, and $G_9$. Hence, the first data store 224A is operable to store telematics data from telematics devices $G_1$, $G_4$, and $G_7$, the second data store 224B is operable to store telematics data from telematics devices $G_2$, $G_5$, and $G_8$, and the third data store 224BC is operable to store telematics data from telematics devices $G_3$, $G_6$, and $G_9$. However, it should be appreciated that various associations between the data stores 224 and the telematics devices 130 are possible. In some cases, two or more data stores 224 may be associated with the same telematics device 130 and can each store telematics data retrieved from that telematics device 130. In other cases, one or more telematics devices 130 may only be associated with single data store 224.

Each fleet management server 220 can include one or more downloaders 222 for each data store 224. Each downloader 222 can establish a communication channel 226 to a gateway server 210 to request telematics data on behalf of a data store 224. In response, the gateway server 210 can transmit the telematics data across the communication channel 226 so that the telematics data can be stored at the data store 224. In this manner, the downloaders 222 can enable the data stores 224 to receive telematics data from telematics devices 130 by connecting to the gateway servers 210 that are connected to the telematics devices 130. Each fleet management server 220 can include, for each data store 224, a downloader 222 for each gateway server 210 that the data store 224 requires access.

In the illustrated example, for the first data store 224A, downloader 222A can establish communication channel 226A to the first gateway server 210A to request telematics data from telematics device $G_1$, downloader 222B can establish communication channel 226B to the second gateway server 210B to request telematics data from telematics device $G_4$, and downloader 222C can establish communication channel 226C to the third gateway server 210C to request telematics data from telematics device $G_7$. Similarly, for the second data store 224B, downloader 222D can establish communication channel 226D to the first gateway server 210A to request telematics data from telematics device $G_2$, downloader 222E can establish communication channel 226E to the second gateway server 2108 to request telematics data from telematics device $G_5$, and downloader 222F can establish communication channel 226F to the third gateway server 210C to request telematics data from telematics device $G_8$. Likewise, for the third data store 224C, downloader 222G can establish communication channel 226G to the first gateway server 210A to request telematics data from telematics device $G_3$, downloader 222H can establish communication channel 226H to the second gateway server 210B to request telematics data from telematics device $G_6$, and downloader 222I can establish communication channel 226I to the third gateway server 210C to request telematics data from telematics device $G_9$.

Each gateway server 210 can include a plurality of network sockets 212. The network sockets 212 can operate as endpoints for receiving and/or transmitting data. The structure and properties of the network sockets 212 can depend on the communication protocols used between the gateway server 210 and downloaders 222. In some cases, the network sockets 212 may be TCP (Transmission Control Protocol) sockets. Each communication channel 226 established by a downloader 222 can be connected to a separate network socket 212.

The number of network sockets 212 available at each gateway server 210 may be limited due to hardware and/or software restrictions of the gateway server 210. For instance, the capacity of the hardware (e.g., processor 112, data storage 114, and/or communication interface 116) of the gateway server 210 to transmit and receive data may be limit the number of network sockets 212. Likewise, the communication protocol employed by the gateway server 210 may limit the number of network sockets 212. For example, the data structure for network port identifiers may limit the number of network sockets 212. For instance, for TCP, the number of network sockets 212 may be limited to 65,535 sockets.

To accommodate additional telematics devices 130 and/or tenants, additional data stores 224 and/or fleet management servers 220 can be added to the fleet management system 110. However, as the number of data stores 224 increases, the number of downloaders 222 required to connect to the gateway servers 210 will also increase, increasing the number of communication channels 226 occupying network sockets 212 at the gateway servers 210. In the worst-case scenario where each data store 224 requires access each gateway server 210, the total number of network sockets 212 occupied by the communication channels 226 established by the downloaders 222 is equal to the number of gateway servers 210 multiplied by the number of data stores 224. Hence, a large enough number of data stores 224 may result in insufficient network sockets 212 being available at the gateway servers 210, constraining the transfer of telematics data to the fleet management servers 220. Thus, an improved architecture for the fleet management system 110 may be required to collect telematics data for large scale implementations involving many telematics devices 130 and/or tenants.

Figure 4:
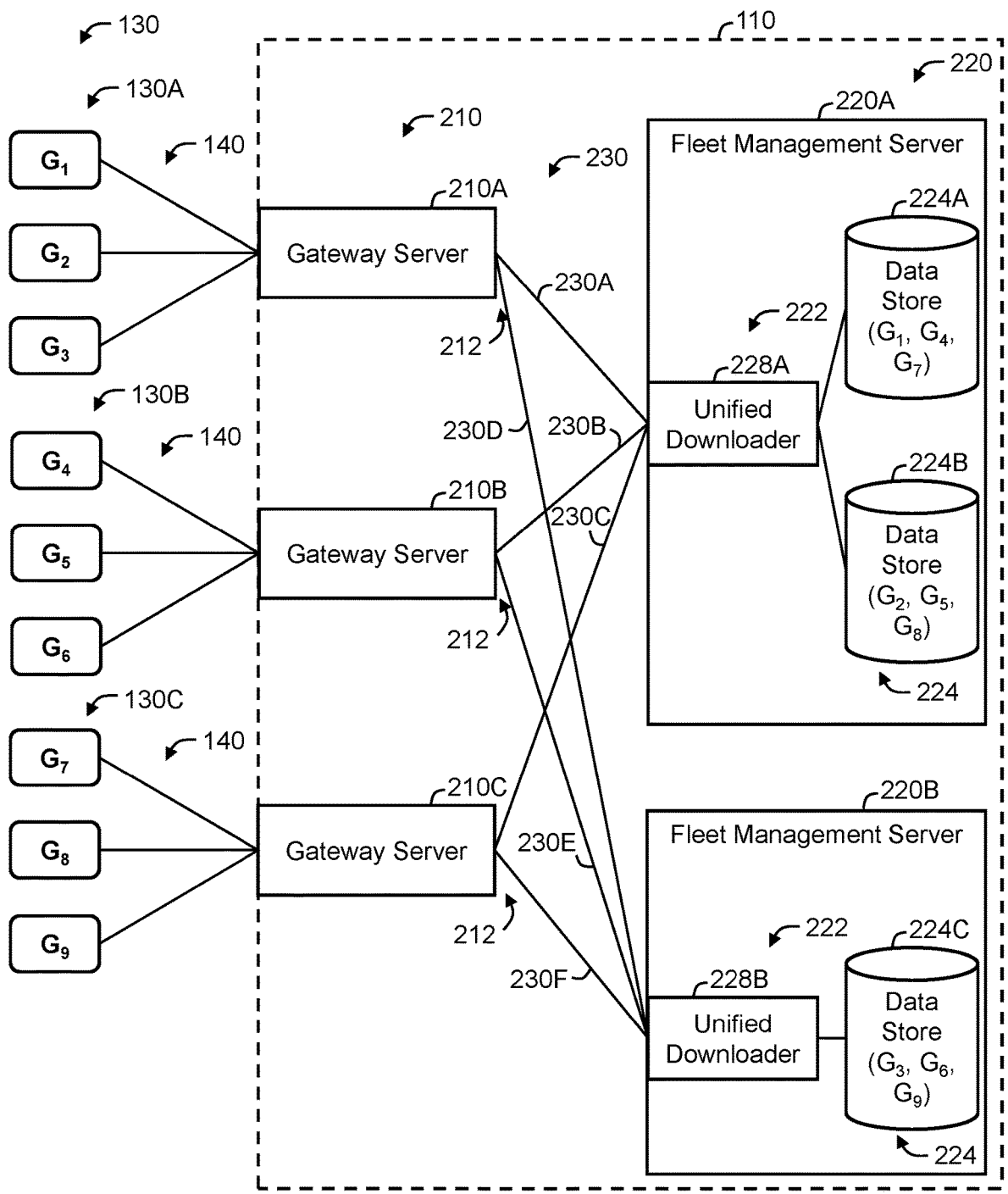
FIG. 4 is a block diagram of another example fleet management system interacting with a plurality of telematics devices, in accordance with an embodiment.

Reference will now be made to FIG. 4 to illustrate another example implementation of the fleet management system 110. In the illustrated example, each fleet management server 220 includes a single unified downloader 228. That is, each fleet management server 220 includes one unified downloader 228, regardless of the number of data stores 224. Each unified downloader 228 can establish a single communication channel 230 to each gateway server 210. Hence, in the worst-case scenario where each data store 224 requires access to each gateway server 210, the total number of network sockets 212 occupied by the communication channels 230 established by the unified downloaders 228 is equal to the number of gateway servers 210 multiplied by the number of fleet management servers 220. Since each fleet management server 220 can include multiple data stores 224, the number of occupied network sockets 212 is significantly reduced in typical scenarios. The resultant increased number of available network sockets 212 can allow the fleet management system 110 to service additional tenants and telematics devices 130 by providing additional data stores 224 and fleet management servers 220.

To facilitate the operation of the unified downloaders 228, the communication channels 230 can be multiplexed. As shown, each unified downloader 228 can establish a single communication channel 230 to each gateway server 210 to collect telematics data for a plurality of data stores 224. That is, each communication channel 230 can transport telematics data from telematics devices 130 that are associated with more than one data store 224. For instance, in the illustrated example, a first communication channel 230A can transport telematics data associated with telematics devices $G_1$ and $G_2$ (i.e., $G_1$ being associated with the first data store 224A and $G_2$ being associated with the second data store 224B), a second communication channel 230B can transport telematics data associated with $G_4$ and $G_5$ (i.e., $G_4$ being associated with the first data store 224A and $G_5$ being associated with the second data store 224B), and a third communication channel 230C can transport telematics data associated with telematics devices $G_7$ and $G_8$ (i.e., $G_7$ being associated with the first data store 224A and $G_8$ being associated with the second data store 224B.

To facilitate multiplexing, the communication channels 230 may operate as persistent channels that allow the telematics data to be transported as asynchronous streams. This may allow a unified downloader 228 to send multiple requests for telematics data to a gateway server 210, without waiting for a response from the gateway server 210 between each request. Likewise, the gateway server 210 can transmit telematics data in response to any of the requests, in any order, and at any time. Hence, multiple requests and responses can be completed concurrently, and out of sequence, via the same persistent communication channel 230. The telematics data may be transported in this manner using various RPC (remote procedure call) protocols, such as, but not limited to, gRPC (Google™ remote procedure call).

In some embodiments, at least a portion of the unified downloaders 228 may be executed remotely from the fleet management servers 220. For example, at least a portion of the unified downloaders 228 may be executed on a separate server computer, virtual machine, or container from fleet management servers 220. An advantage of remotely executing at least a portion of the unified downloaders 228 is that the unified downloaders 228 can be implemented without modifying or reconfiguring the fleet management servers 220. The fleet management servers 220 may have existing functionality that may conflict or otherwise make it difficult to execute the unified downloaders 228 on the fleet management servers 220. When at least a portion of the unified downloaders 228 are remotely executed, communication channels can be established between the unified downloaders 228 and the fleet management servers 220 and/or data stores 224.

In some embodiments, the gateway servers 210 can include one or more backup data stores (not shown). In some cases, each gateway server 210 may include one or more backup data stores. In other cases, one or more backup data stores can be shared among two or more gateway servers 210. The backup data stores can temporarily store telematics data retrieved from the telematics devices 130. In this manner, the backup data stores can serve as redundant data stores that can be used to recover telematics data, in case of data loss at the fleet management servers 220. In operation, the fleet management servers 220 may transmit receipt confirmations to the gateway servers 210 in response to receiving telematics data from the gateway servers 210. In response, the gateway server 210 can delete the telematics data from the backup data stores.

Figure 5:
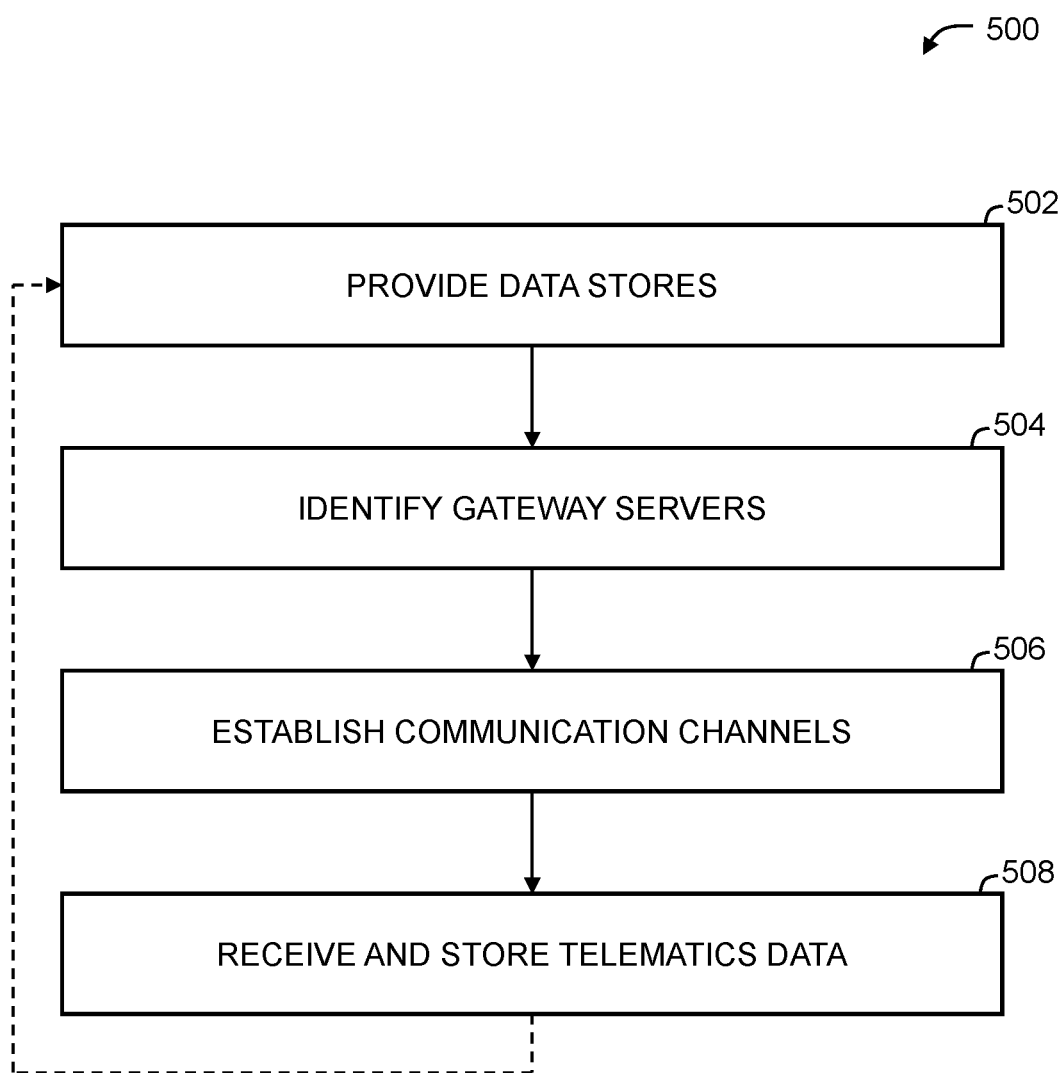
FIG. 5 is a flowchart of an example method for collecting telematics data from a plurality of telematics devices, in accordance with an embodiment.

Reference will now be made to FIG. 5, which illustrates an example method 500 for collecting telematics data from a plurality of telematics devices 130. Method 500 can be implemented by the fleet management system 110 shown in FIG. 4.

At 502, a first and second data store 224 can be provided at a fleet management server 220. The first data store 224A can store a first set of telematics data associated with a first group of telematics devices 130. The second data store 224B can store a second set of telematics data associated with a second group of telematics devices 130.

For instance, in the example illustrated in FIG. 4, first and second data stores 224A and 224B are provided at the first fleet management server 220A. As shown, the first data store 224A is operable to store telematics data associated with a first group of telematics devices 130 (i.e., telematics devices $G_1$, $G_4$, and $G_7$). Similarly, the second data store 224B is operable to store telematics data associated with a second group of telematics devices (i.e., telematics devices $G_2$, $G_5$, and $G_9$).

It should be appreciated that a group of telematics devices 130 can include any number of telematics devices 130. In some cases, a group of telematics devices 130 may consist of a single telematics device 130. In some embodiments, the first and second group of telematics devices 130 can include at least one common telematics device 130. That is, one or more telematics devices 130 may belong to both the first and second group of telematics devices 130. In other cases, there may not be any common telematics devices 130 that belong to both the first and second group of telematics devices 130.

At 504, a first and second group of gateway servers 210 can be identified. The first group of gateway servers 210 can be in communication with the first group of telematics devices 130. The second group of gateway servers 210 can be in communication with the second group of telematics devices 130. The first and second group of gateway servers 210 can include at least one common gateway server 210. That is, one or more gateway servers 210 may belong to both the first and second group of gateway servers 210.

For instance, in the example illustrated in FIG. 4, a first group of gateway servers 210 (i.e., the first, second, and third gateway servers 210A, 210B, 210C) in communication with the first group of telematics devices 130 (i.e., telematics devices $G_1$, $G_4$, and $G_7$) can identified. Similarly, a second group of gateway servers 210 (i.e., the first, second, and third gateway servers 210A, 210B, 210C) in communication with the second group of telematics devices 130 (i.e., telematics devices $G_2$, $G_5$, and $G_9$) can identified. In the illustrated example, the first, second, and third gateway servers 210A, 210B, 210C are common gateway servers 210 that belong to both the first and second group of gateway servers 210.

It should be appreciated that a group of gateway servers 210 can generally include any number of gateway servers 210. In some cases, a group of gateway servers 210 may consist of a single gateway server 210. In some cases, there may be one or more gateway servers 210 that belong to the first group of gateway servers 210 but do not belong to second group of gateway servers 210. Likewise, there may be one or more gateway servers 210 that belong to the second group of gateway servers 210 but do not belong to first group of gateway servers 210.

At 506 a plurality of communication channels 230 can be established using a unified downloader 228. A communication channel 230 can be established between each gateway server 210 in the first and second groups of gateway servers 210 and the unified downloader 228. Each communication channel 230 can connect to a network socket 212 of the corresponding gateway server 210. A single communication channel 230 can be established to each common gateway server 210.

For instance, in the example illustrated in FIG. 4, the unified downloader 228A of the first fleet management server 220A can establish first, second, and third communication channels 230A, 230B, 230C to the first second, and third gateway servers 210A, 210B, 210C, respectively. As shown, the first, second, and third communication channels 230A, 230B, 230C provide a connection to each gateway server 210 in the first and second groups of gateway servers 210, including the common gateway servers 210. A single communication channel 230 is established between the unified downloader 228A each common gateway server 210.

As described herein, the communication channels 230 can be multiplexed to transport at least a portion of both the first and second set of telematics data. The communication channels 230 can be persistent and the telematics data may be transported across the communication channels 230 as asynchronous streams. For instance, in the example illustrated in FIG. 4, the first communication channel 230A can transport telematics data associated with telematics devices $G_1$ and $G_2$ (i.e., $G_1$ belonging to the first set and $G_2$ belonging to the second set), the second communication channel 230B can transport telematics data associated with $G_4$ and $G_5$ (i.e., $G_4$ belonging to the first set and $G_5$ belonging to the second set), and the third communication channel 230C can transport telematics data associated with telematics devices $G_7$ and $G_8$ (i.e., $G_7$ belonging to the first set and $G_8$ belonging to the second set).

At 508, the first and second set of telematics data can be received through the plurality of communication channels 230. The first set of telematics data can be stored in the first data store 224. The second set of telematics data can be stored in the second data store 224.

For instance, in the example illustrated in FIG. 4, telematics data associated with telematics devices $G_1$, $G_4$, $G_7$ (i.e., the first group of telematics devices) and telematics devices $G_2$, $G_5$, $G_8$ (i.e., the second group of telematics devices) can be received through the plurality of communication channels 230. Specifically, telematics data associated with telematics devices $G_1$ and $G_2$ can be received from the first gateway server 210A through the first communication channel 230A, telematics data associated with telematics devices $G_4$ and $G_5$ can be received from the second gateway server 210B through the second communication channel 230B, and telematics data associated with telematics devices $G_7$ and $G_8$ can be received from the third gateway server 210C through the third communication channel 230C. The telematics data associated with telematics devices $G_1$, $G_4$, $G_7$ (i.e., the first group of telematics devices 130) can be stored in the first data store 224A. The telematics data associated with telematics devices $G_2$, $G_5$, $G_8$ (i.e., the second group of telematics devices 130) can be stored in the second data store 224B.

Figure 6:
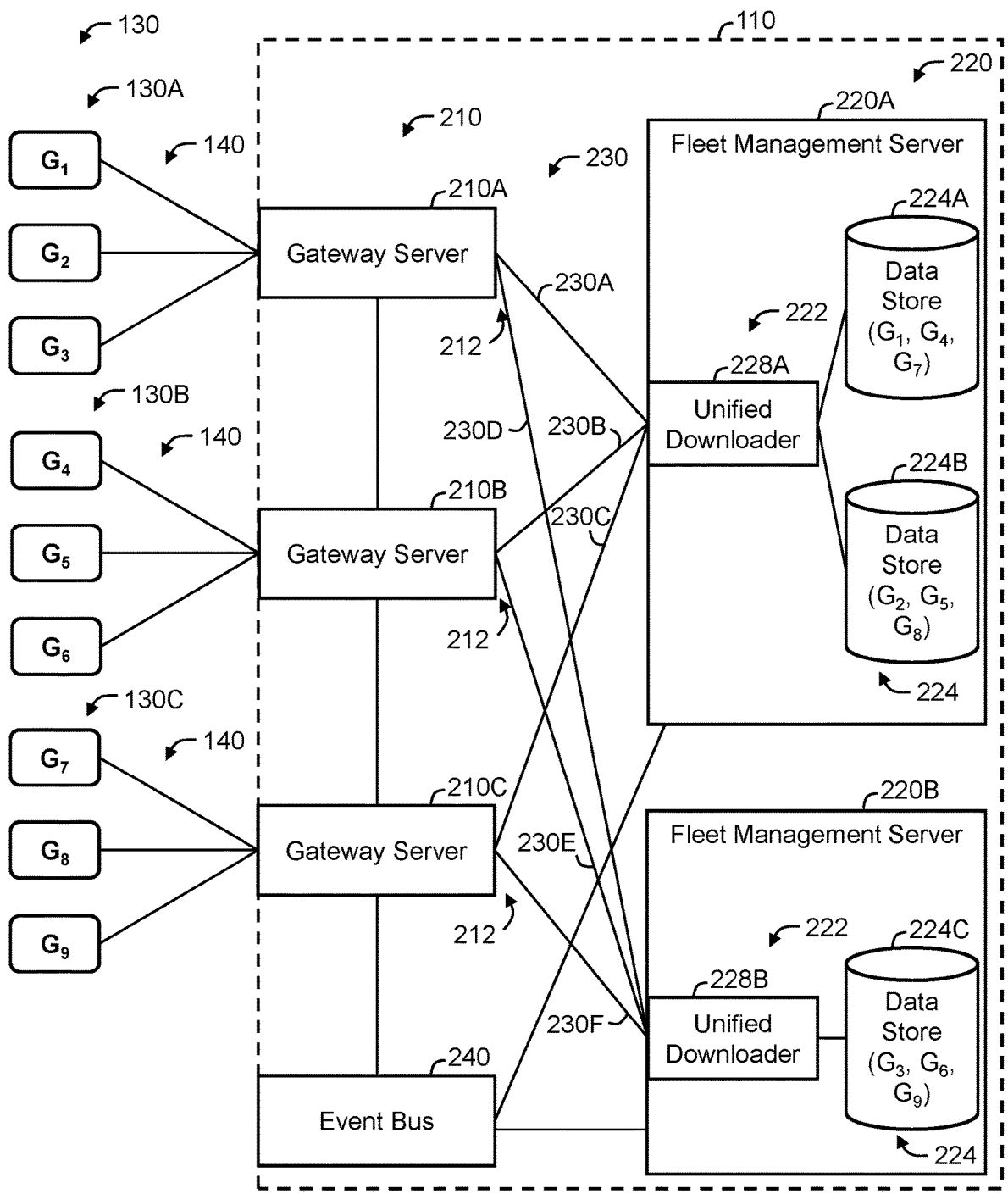
FIG. 6 is a block diagram of another example fleet management system interacting with a plurality of telematics devices, in accordance with an embodiment.

Reference will now be made to FIG. 6, which illustrates another example implementation of the fleet management system 110. In the illustrated example, the fleet management system 110 further includes an event bus 240. As shown, the event bus 240 can be in communication with the gateway servers 210. Similarly, the event bus 240 can also be in communication with the fleet management servers 220.

The event bus 240 can store a plurality of event records. Each event record can indicate the occurrence of an event or action. Various types of events can be recorded as event records at the event bus 240. In this manner, the event bus 240 can provide a centralized record of events that can be referenced by other devices or systems, such as the gateway servers 210 and fleet management servers 220. An advantage of this implementation that devices or systems can interact with the event bus 240 instead of other devices or systems associated with the events. This can reduce the number of interactions with the devices or systems associated with the events.

One example of an event that can be recorded as an event record at the event bus 240 is the connection of a telematics device 130 to a gateway server 210. For example, an event record indicating that a telematics device 130 is connected to a gateway server 210 can be registered at the event bus 240 in response to the gateway server 210 detecting that the telematics device 130 is connected to the gateway server 210. This type of event record can be used by the fleet management servers 220 to determine which telematics devices 130 are connected to which gateway servers 210 at a given time. In this manner, the fleet management servers 220 can determine which gateway servers 210 to connect to, in order to collect telematics data retrieved from particular telematics devices 130. An advantage of this implementation is that the fleet management servers 220 can identify the gateway server 210 that is connected to a particular telematics device 130 by requesting connection information from the event bus 240, instead of the gateway server 210. This can allow the gateway servers 210 to operate more efficiently, by freeing resources that would otherwise be used to maintain and provide connection information from the fleet management servers 220.

Another example of an event that can be recorded as an event record at the event bus 240 is the granting of permissions to a data store 224 to receive telematics data from a telematics device 130. Such event records can be used by the gateway servers 210 to determine whether to grant to a request from a fleet management server 220 to receive telematics data associated with a particular telematics device 130. In this implementation, the gateway servers 210 can determine data permissions by requesting permission information from the event bus 240, instead of from the gateway servers 210 themselves or other portions of the fleet management system 110. An advantage of this implementation is that permission information can be centralized at the event bus 240, instead of distributed across the fleet management system 110. This can allow the gateway servers 210 to operate more efficiently, by freeing resources that would otherwise be used to maintain and provide permissions information.

Referring now to FIG. 7, there is shown an example of a plurality of event records 700 that can be maintained at the event bus 240. As shown, each event record 700 can correspond to an event and include an event type 710, an event description 720, and an event timestamp 730. The event type 710 can indicate the type of event that occurred, the event description 720 can indicate what occurred during the event, and the timestamp 730 can indicate when the event occurred. In the illustrated example, the event types 710 include device connection events and data permission events. However, it should be appreciated that other event types 710 are possible. For a device connection event, the event description 720 and event timestamp 730 can indicate that a particular telematics device 130 is connected to a particular gateway server 210, and when the connection occurred. Similarly, for a data permission event, the event description 720 and event timestamp 730 can indicate that a particular data store 224 has been granted permission to receive telematics data associated with a particular telematics device 130, and when the permission was granted.

Any subset of the plurality of event records 700 can be provided by the event bus 240 to another system, such as a gateway server 210 or a fleet management server 220, to provide a historical record of events to that system. In some cases, the event records 700 can be transmitted in batches or intermittently. For example, event records 700 may be transmitted to another system to notify that system of events that occurred while the system was offline or otherwise non-operational. Since each event records 700 can include a timestamp 730, event records 700 corresponding to events that occurred while the system was non-operational can be identified and provided to that system. In other cases, the event records 700 can be provided to other systems in a regular, live, or continuous manner.

Figure 8:
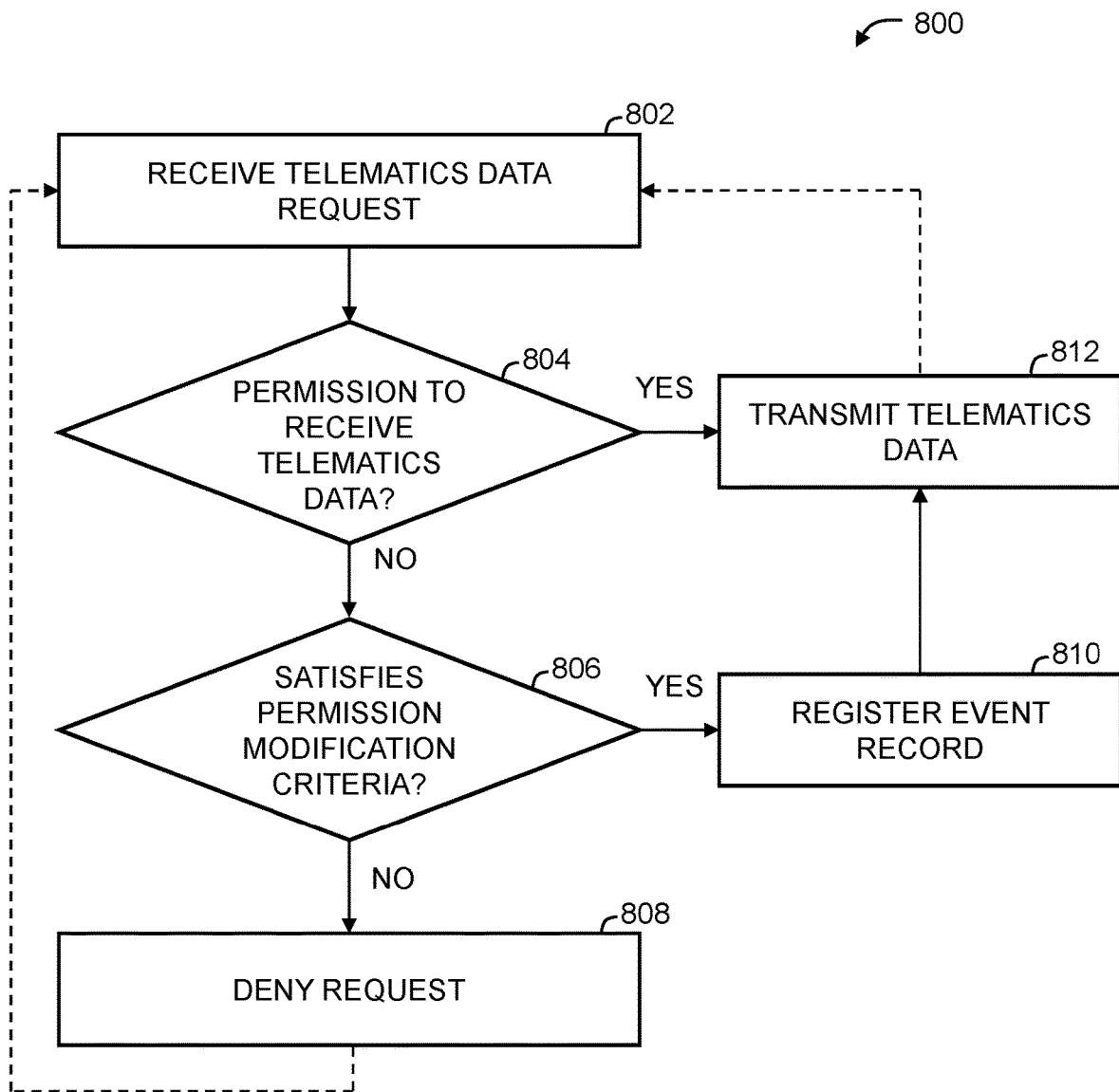
FIG. 8 is a flowchart of another example method for collecting telematics data from a plurality of telematics devices, in accordance with an embodiment.

Reference will now be made to FIG. 8, which illustrates an example method 800 for collecting telematics data from a plurality of telematics devices 130. Method 800 can be implemented by the fleet management system 110 shown in FIG. 6 that includes event bus 240.

At 802, a request to receive a set of telematics data associated with a telematics device 130 can be received. The request can be received at a gateway server 210 in communication with the telematics device 130. The request can be received from a fleet management server 220 and can be associated a data store 224 at the fleet management server 220. For instance, in the example illustrated in FIG. 6, the first gateway server 210A may receive a request, from the first fleet management server 220A and associated with the first data store 224A, for a set of telematics data associated with telematics device $G_1$.

At 804, the gateway server 210 can be determine whether the data store 224 has permission to receive the set of telematics data associated with the telematics device 130. The determination can be made based on a first event record 700 registered at an event bus 240 in communication with the gateway server 210. If it is determined that the data store 224 has permission to receive the set of telematics data associated with the telematics device 130, method 800 can proceed to 812. If it is determined that the data store 224 does not have permission to receive the set of telematics data associated with the telematics device 130, method 800 can proceed to 806.

For instance, continuing with the example illustrated in FIG. 6, the first gateway server 210A can determine whether the first data store 224A has permission to receive the set of telematics data associated with telematics device $G_1$ based on a first event record 700 registered at the event bus 240. The first gateway server 210A can determine that the first data store 224A has permission to receive the set of telematics data associated with telematics device G1 if the first event record 700 indicates that the first data store 224A has permission to receive the set of telematics data associated with telematics device G1. However, if the first event record 700 indicates that another data store 224 has permission to receive the set of telematics data associated with telematics device G1, the first gateway server 210A can determine that the first data store 224A does not have permission to receive the set of telematics data associated with telematics device G1.

The first event record 700 can identified as the latest or most recent event record 700 associated with the telematics device 130 that has the latest or most recent timestamp indicating that a particular data store 224 has permission to receive telematics data associated with the telematics device 130. The latest or most recent event record 700 can be identified based on the timestamp 730. For instance, in the example illustrated in FIG. 7, there are two event records pertaining to permissions to receive telematics data associated with telematics device $G_1$. One event record indicates that the first data store 224A is permitted to receive telematics data associated with telematics device $G_1$, while another event record indicates the second data store 224B is permitted to receive telematics data associated with telematics device $G_1$. The event record indicating that the first data store 224A is permitted to receive telematics data associated with telematics device $G_1$ can be identified as the first event record because the timestamp 730 of that event record is more recent than the other event record.

At 806, the gateway server 210 can determine whether the request satisfies at least one permission modification criteria. The determination can be made in response to determining that the data store 224 does not have permission to receive the set of telematics data associated with the telematics device 130 at 804. If it is determined that the request satisfies at least one permission modification criteria, method 800 can proceed to 810. If it is determined that the request does not satisfy at least one permission modification criteria, method 800 can proceed to 808.

Various permission modification criteria can be evaluated at 806. In some embodiments, the permission modification criteria can pertain to whether another request associated with another data store 224 was received within a predetermined time period. In other words, the authority to receive telematics data associated with a particular telematics device 130 may be based on the first device to request the telematics data within a predetermined time period. For example, a permission modification criteria may be satisfied if another request associated with another data store to receive the data records associated with the telematics device was not received within a predetermined time period. Likewise, a permission modification criteria may not be satisfied if another request associated with another data store to receive the data records associated with the telematics device was received within the predetermined time period. The duration of predetermined time period may vary depending on the fleet management system 110. For example, the predetermined time period may be 1 hour, 4 hours, 12 hours, 1 day, 3 days, 1 week, etc.

In other embodiments, the permission modification criteria can pertain to an access level of the fleet management server 220 or data store 224 associated with the request. For example, a permission modification criteria may be satisfied if the request is associated with a fleet management server 220 or data store 224 having a higher access level than another request associated with another data store 224 or fleet management server 220 having a lower access level. In other embodiments, the permission modification criteria can pertain to whether the request was approved by another device or system. For example, a permission modification criteria may be satisfied if the request was approved by an administrative user or system.

At 810, a second event record 700 can be registered at the event bus 240. The second event record 700 can indicate that the data store 224 has permission to receive the set of telematics data associated with the telematics device 130. The second event record 700 can be registered in response to determining that the request satisfies at least one permission modification criteria at 806. For instance, continuing with the example illustrated in FIG. 6, if it is determined that the request satisfies at least one permission modification criteria, a second event record 700 can be registered at the event bus indicating that the first data store 224A has permission to receive the set of telematics data associated with telematics device $G_1$.

The second event record can be used to evaluate future requests to receive telematics data associated with the telematics device 130. For example, subsequent to 810, another request, associated with a different data store 224, to receive the set of telematics data associated with the telematics device 130 may be received at the gateway server 210. Based on the second event record 700, it can be determined that the other data store 224 does not have permission to receive the set of telematics data associated with the telematics device 130.

At 812, the set of telematics data associated with the telematics device 130 can be transmitted from the gateway server 210 to the fleet management server 220 in response to the request. In other words, the request can be granted. The request can be granted in response to determining that the request satisfies at least one permission modification criteria at 806 or determining that the data store 224 has permission to receive the set of telematics data associated with the telematics device 130 at 804.

For instance, continuing with the example shown in FIG. 6, the first gateway server 210A can transmit the set of telematics data collected from telematics device $G_1$ to the first fleet management server 220A. The first fleet management server 220A can store the set of telematics data in the first data store 224A associated with the request. As shown, the telematics data can be transmitted across a first communication channel 230A established between the first fleet management server 220A and the gateway server 210A. As described herein, the communication channel 230A can be multiplexed so that telematics data associated with more than one data store 224 can be transported across the same communication channel 230A. The telematics data can be transported as asynchronous streams.

In some embodiments, prior to 812, the fleet management server 220 can identify the gateway server 210 in communication with the telematics device 130 based on a third event record 700 registered at the event bus 240. The third event record 700 can indicate that the telematics device 130 is connected to the gateway server 210. The fleet management server 220 can determine whether the fleet management server 220 is connected to the gateway server 210. If it is determined that the fleet management server 220 is not connected to the gateway server 210, the fleet management server 220 can establish a communication channel 230 between the first fleet management server 220A and the gateway server 210A.

At 808, the request can be denied. In other words, the gateway server 210 can refuse to transmit the set of telematics data associated with the telematics device 130 to the fleet management server 220. The denial of the request can be made in response to determining that the request does not satisfy at least one permission modification criteria at 806. For instance, continuing with the example shown in FIG. 6, if it is determined that the request does not satisfy at least one permission modification criteria, the first gateway server 210A can refuse to transmit the set of telematics data associated with telematics device $G_1$ to the first fleet management server 220A.

Figure 9:
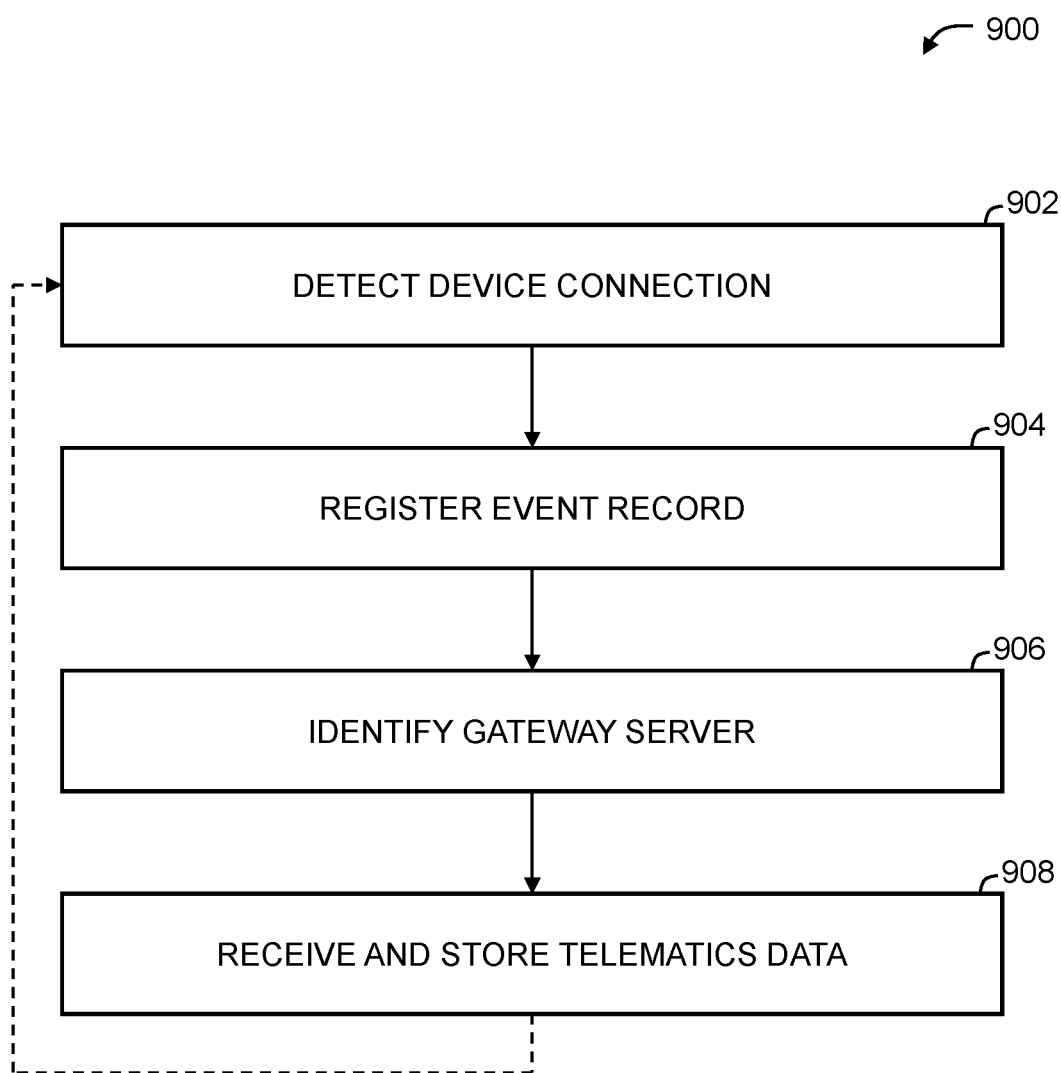
FIG. 9 is a flowchart of another example method for collecting telematics data from a plurality of telematics devices, in accordance with an embodiment.

Reference will now be made to FIG. 9, which illustrates an example method 900 for collecting telematics data from a plurality of telematics devices 130. Method 900 can also be implemented by the fleet management system 110 shown in FIG. 6 that includes event bus 240.

At 902, a connection by a telematics device 130 to a gateway server 210 can be detected at the gateway server 210. For instance, in the example illustrated in FIG. 6, the first gateway server 210A can detect that telematics device $G_1$ is connected to the first gateway server 210A.

The telematics device 130 may have connected to the gateway server 210 for a variety of reasons. For example, the telematics device 130 may have connected to the gateway server 210 during the activation of the telematics device 130. Alternatively, the telematics device 130 may have been previously activated and connected to another gateway server 210, but switched to the gateway server 210 due to load balancing, latency, etc.

At 904, an event record 700 can be registered at an event bus 240 in communication with the gateway server 210. The event record 700 can indicate that the telematics device 130 is connected to the gateway server 210. For instance, continuing with the example illustrated in FIG. 6, an event record 700 indicating that telematics device $G_1$ is connected to the first gateway server 210A can be registered at the event bus 240. The event record can include a timestamp representing when the connection by the telematics device 130 to the gateway server 210 was established.

At 906, a fleet management server 220 can identify the gateway server 210 in communication with the telematics device 130 based on the event record 700. For instance, in the example illustrated in FIG. 6, the first fleet management server 220A can identify that the first gateway server 210A is in communication with the telematics device $G_1$ based on the event record 700 registered at the event bus 240.

In some embodiments, the fleet management server 220 can identify the gateway server 210 in communication with the telematics device 130 based on more than one event record 700. For example, the fleet management server 220 may receive a plurality of event records 700 from the event bus 240. The fleet management server 220 may identify the gateway server 210 in communication with the telematics device 130 based on the timestamps of the event records 700 associated with the telematics device 130. For instance, in the example illustrated in FIG. 7, there are multiple event records 700 indicating connections by telematics device $G_1$ to different gateway servers 210 at different times. As shown, a first event record 700 indicates that telematics device $G_1$ was connected to the second gateway server 210B at a first time, whereas a second event record 700 indicates that telematics device $G_1$ was connected to the first gateway server 210A at a second time. The fleet management server 220 can determine that telematics device $G_1$ is connected to the first gateway server 220A because the second time is subsequent to the first time, and therefore, the telematics device $G_1$ was most recently connected to the first gateway server 210A.

In some embodiments, each fleet management server 220 can maintain a mapping of the plurality of telematics devices 130 to the plurality of gateway servers 210. The fleet management servers 220 can update the mappings based on one or more event records 700 received from the event bus 240. The fleet management servers 220 can use the mappings to identify each gateway server 210 in communication with each telematics device 130. The mappings can also be used by the fleet management servers 220 to identify gateway servers 210 that the fleet management servers 220 no longer need to be connected to. For example, the mapping can be used to identify one or more gateway servers 210 that are not connected to any of the telematics devices 130 associated with any of the data stores 224 at the fleet management server 220. The fleet management server 220 can terminate the unused communication channels 230 between the fleet management server 220 and the gateway servers 210.

At 908, the fleet management server 220 can receive a set of telematics data associated with the telematics device 130 from the gateway server 210. The fleet management server 220 can store the set of telematics data in one or more data stores 224 associated with the telematics device 130. For instance, continuing with the example illustrated in FIG. 6, the first fleet management server 220A can receive a set of telematics data associated with telematics device $G_1$ from the first gateway server 210A. As shown, the set of telematics data associated with telematics device $G_1$ can be received through the first communication channel 230A established by the first unified downloader 228A. The set of telematics data can then be stored in the first data store 224A, which is associated with telematics device $G_1$.

In some embodiments, prior to 908, the fleet management server 220 can determine whether the fleet management server 220 is already connected to the gateway server 210. If the fleet management server 220 is not already connected to the gateway server 210, the fleet management server 220 can establish a communication channel 230 to the gateway server 210. For example, a unified downloader 228 of the fleet management server 220 can establish a communication channel 230, which may be multiplexed and transport telematics data as asynchronous streams. The established communication channel 230 may transport telematics data associated with two or more data stores 224.

In some embodiments, prior to 908, the gateway server 210 can determine whether the one or more data stores 224 have permission to receive the set of telematics data associated with the telematics device 130. The gateway server 210 can make the determination based on another event record 700 registered at the event bus 240. The other event record 700 may indicate whether the one or more data stores 224 have permission to receive the set of telematics data associated with the telematics device 130.

In some embodiments, steps 906 and 908 can be executed a plurality of fleet management servers 220. In this manner, each fleet management server 220 having at least one data store 224 associated with the telematics device 130 can identify the gateway server 210 in communication with the telematics device 130, receive the set of telematics data associated with the telematics device 130, and store the set of telematics data in one or more data stores 224.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device. Furthermore, the term "coupled" may indicate that two elements can be directly coupled to one another or coupled to one another through one or more intermediate elements.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Furthermore, any recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). Programmable hardware such as FPGA can also be used as standalone or in combination with other devices. These devices may also have at least one input device (e.g., a pushbutton keyboard, mouse, a touchscreen, and the like), and at least one output device (e.g., a display screen, a printer, a wireless radio, and the like) depending on the nature of the device. The devices may also have at least one communication device (e.g., a network interface).

It should also be noted that there may be some elements that are used to implement at least part of one of the embodiments described herein that may be implemented via software that is written in a high-level computer programming language such as object-oriented programming. Accordingly, the program code may be written in C, C++ or any other suitable programming language and may comprise modules or classes, as is known to those skilled in object-oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g., a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

The invention claimed is:

1. A method for collecting telematics data from a plurality of telematics devices, the method comprising:
   providing, at a plurality of fleet management servers, a plurality of data stores, each data store associated with at least one telematics device, each data store operable to store a set of telematics data associated with the at least one telematics device;

detecting, at a gateway server, a connection by a telematics device to the gateway server;

registering, at an event bus in communication with the gateway server, an event record indicating that the telematics device is connected to the gateway server;

for each fleet management server having at least one data store associated with the telematics device:

receiving, at the fleet management server, the event record from the event bus;

updating, at the fleet management server, a mapping of the plurality of telematics devices to the plurality of gateways based on the event record;

identifying, at the fleet management server, the gateway server in communication with the telematics device based on the mapping;

receiving, at the fleet management server, a set of telematics data associated with the telematics device from the gateway server; and storing, at the at least one data store, the set of telematics data associated with the telematics device.

2. The method of claim 1, further comprising:

identifying, based on the mapping, at least one gateway server connected to the fleet management system that is not connected to any telematics devices associated with any data stores at the fleet management system; and terminating a communication channel between the fleet management server and the gateway server.

3. The method of claim 1, further comprising:

determining whether the fleet management server is connected to the gateway server; and in response to determining that that the fleet management server is not connected to the gateway server, establishing a communication channel between the fleet management server and the gateway server.

4. The method of claim 3, wherein the communication channel is multiplexed so that telematics data associated with at least two data stores at the fleet management server are receivable through the same communication channel.

5. The method of claim 1, wherein the event record comprises a timestamp representing when the connection by the telematics device to the gateway server was established.

6. The method of claim 1, wherein the gateway server is a second gateway server, the event record is a second event record, and the method further comprises:

prior to detecting the connection by the telematics device to the second gateway server, detecting, at a first gateway server, a connection by the telematics device to the first gateway server;

registering, at the event bus, a first event record indicating that the telematics device is connected to the first gateway server; and identifying, at the fleet management server, the second gateway server in communication with the telematics device based on the first and second event records.

7. The method of claim 1, further comprising:

receiving, at each fleet management server, a plurality of event records from the event bus, each event record indicating that one telematics device is connected to one gateway server.

8. The method of claim 1, further comprising:

prior to receiving the set of telematics data associated with the telematics device from the gateway server at the fleet management server, determining that the at least one data store has permission to receive the set of telematics data associated with the telematics device based on another event record registered at the event bus.

9. The method of claim 1, wherein the plurality of telematics devices is installed in a plurality of vehicles, and the telematics data comprises vehicle data collected from the plurality of vehicles.

10. A non-transitory computer readable medium having instructions stored thereon executable by at least one processor to implement a method for collecting telematics data from a plurality of telematics devices, the method comprising:

providing, at a plurality of fleet management servers, a plurality of data stores, each data store associated with at least one telematics device, each data store operable to store a set of telematics data associated with the at least one telematics device;

detecting, at a gateway server, a connection by a telematics device to the gateway server;

registering, at an event bus in communication with the gateway server, an event record indicating that the telematics device is connected to the gateway server;

for each fleet management server having at least one data store associated with the telematics device:

receiving, at the fleet management server, the event record from the event bus;

updating, at the fleet management server, a mapping of the plurality of telematics devices to the plurality of gateways based on the event record;

identifying, at the fleet management server, the gateway server in communication with the telematics device based on the mapping;

receiving, at the fleet management server, a set of telematics data associated with the telematics device from the gateway server; and storing, at the at least one data store, the set of telematics data associated with the telematics device.

11. A system for collecting telematics data from a plurality of telematics devices, the system comprising:

a plurality of fleet management servers comprising a plurality of data stores, each data store associated with at least one telematics device, each data store operable to store a set of telematics data associated with the at least one telematics device;

a plurality of gateway servers in communication with the plurality of telematics devices; and an event bus in communication with the plurality of gateway servers and the plurality of fleet management servers, the event bus operable to register a plurality of event records;

wherein, in operation:

a gateway server detects a connection by a telematics device to the gateway server;

the event bus registers an event record indicating that the telematics device is connected to the gateway server;

for each fleet management server having at least one data store associated with the telematics device, the fleet management server:

receives the event record from the event bus;

updates a mapping of the plurality of telematics devices to the plurality of gateways based on the event record;

identifies the gateway server in communication with the telematics device based on the mapping;

receives a set of telematics data associated with the telematics device from the gateway server; and stores the set of telematics data associated with the telematics device at the at least one data store.

12. The system of claim 11, wherein in operation, the fleet management server:
identifies, based on the mapping, at least one gateway server connected to the fleet management system that is not connected to any telematics devices associated with any data stores at the fleet management system; and
terminates a communication channel between the fleet management server and the gateway server.

13. The system of claim 11, wherein in operation, the fleet management server:
determines whether the fleet management server is connected to the gateway server; and
in response to determining that that the fleet management server is not connected to the gateway server, establishes a communication channel between the fleet management server and the gateway server.

14. The system of claim 13, wherein the communication channel is multiplexed so that telematics data associated with at least two data stores at the fleet management server are receivable through the same communication channel.

15. The system of claim 11, wherein the event record comprises a timestamp representing when the connection by the telematics device to the gateway server was established.

16. The system of claim 11, wherein the gateway server is a second gateway server, the event record is a second event record, and, in operation:
prior to detecting the connection by the telematics device to the second gateway server, a first gateway server detects a connection by the telematics device to the first gateway server;
the event bus registers a first event record indicating that the telematics device is connected to the first gateway server; and
the fleet management server identifies the second gateway server in communication with the telematics device based on the first and second event records.

17. The system of claim 11, wherein:
each fleet management server is operable to receive a plurality of event records from the event bus, each event record indicating that one telematics device is connected to one gateway server.

18. The system of claim 11, wherein, in operation, prior to receiving the set of telematics data associated with the telematics device from the gateway server at the fleet management server, the gateway server determines that the at least one data store has permission to receive the set of telematics data associated with the telematics device based on another event record registered at the event bus.

19. The system of claim 11, wherein the plurality of telematics devices is installed in a plurality of vehicles, and the telematics data comprises vehicle data collected from the plurality of vehicles.

* * * * *